US012589317B2

(12) United States Patent
Mizrachi

(10) Patent No.: US 12,589,317 B2
(45) Date of Patent: *Mar. 31, 2026

(54) PORTABLE GAMING CONSOLE

(71) Applicant: Bagira Systems Ltd., Holon (IL)

(72) Inventor: Yaron Mizrachi, Holon (IL)

(73) Assignee: Bagira Systems Ltd., Modi'in (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/628,738

(22) Filed: Apr. 7, 2024

(65) Prior Publication Data

US 2024/0245997 A1 Jul. 25, 2024

Related U.S. Application Data

(63) Continuation of application No. 18/337,059, filed on Jun. 19, 2023, now Pat. No. 11,951,406, which is a
(Continued)

(51) Int. Cl.
*A63F 13/90* (2014.01)
*A63F 13/213* (2014.01)
(Continued)

(52) U.S. Cl.
CPC ............ *A63F 13/90* (2014.09); *A63F 13/213* (2014.09); *A63F 13/2145* (2014.09);
(Continued)

(58) Field of Classification Search
CPC ...... A63F 13/90; A63F 13/2145; A63F 13/26; A63F 13/30; A63F 13/53; A63F 13/837;
(Continued)

(56) References Cited

U.S. PATENT DOCUMENTS

| | | | | |
|---|---|---|---|---|
| 6,616,452 B2 * | 9/2003 | Clark | ..................... | F41A 33/02 |
| | | | | 434/21 |
| 7,329,127 B2 * | 2/2008 | Kendir | .................. | F41G 3/2655 |
| | | | | 434/21 |

(Continued)

OTHER PUBLICATIONS

Haselton, Todd. Triple screen display folds up into briefcase. Online. Oct. 16, 2007. Accessed via the Internet. Accessed Oct. 30, 2024. <URL: https://arstechnica.com/gadgets/2007/10/triple-screen-display-folds-up-into-briefcase/> (Year: 2007).*

(Continued)

*Primary Examiner* — Carl V Larsen
(74) *Attorney, Agent, or Firm* — Nathan & Associates; Menachem Nathan

(57) ABSTRACT

A portable gaming console and method of use, the gaming console including: an enclosure; a controller housed in the enclosure and including a processor and a non-transitory computer readable medium; a main display housed in a lid of the enclosure and in data communication with the controller; and a sub-display housed in the enclosure and in data communication with the controller, wherein the sub-display is configured to be folded out of the enclosure, wherein the gaming console is configured to run a game using the controller and to display the game on the main display and supplemental game data on the sub-display.

16 Claims, 9 Drawing Sheets

Related U.S. Application Data continuation of application No. PCT/IB2023/054523, filed on May 1, 2023.

(60) Provisional application No. 63/339,474, filed on May 8, 2022.

(51) Int. Cl.

| | |
|---|---|
| *A63F 13/2145* | (2014.01) |
| *A63F 13/219* | (2014.01) |
| *A63F 13/245* | (2014.01) |
| *A63F 13/26* | (2014.01) |
| *A63F 13/27* | (2014.01) |
| *A63F 13/30* | (2014.01) |
| *A63F 13/426* | (2014.01) |
| *A63F 13/53* | (2014.01) |
| *A63F 13/837* | (2014.01) |
| *F41G 3/26* | (2006.01) |

(52) U.S. Cl.
CPC .......... *A63F 13/219* (2014.09); *A63F 13/245* (2014.09); *A63F 13/26* (2014.09); *A63F 13/27* (2014.09); *A63F 13/30* (2014.09); *A63F 13/426* (2014.09); *A63F 13/53* (2014.09); *A63F 13/837* (2014.09); *F41G 3/2611* (2013.01); *F41G 3/2616* (2013.01)

(58) Field of Classification Search
CPC .... A63F 13/213; A63F 13/245; A63F 13/426; A63F 13/219; A63F 13/22; A63F 13/27; A63F 13/323; A63F 13/92; A45C 2013/025; A45C 2011/003; F41G 3/2611; F41G 3/2616; F41A 33/02; F41J 5/10; G09B 9/003
See application file for complete search history.

(56) References Cited

U.S. PATENT DOCUMENTS

| | | | | |
|---|---|---|---|---|
| 8,878,746 | B2 * | 11/2014 | Lock | G09G 3/20 |
| | | | | 345/1.3 |
| 9,501,097 | B2 * | 11/2016 | Moser | G06F 1/1649 |
| 9,705,283 | B1 * | 7/2017 | Deppe | H01S 5/423 |
| 10,936,020 | B2 * | 3/2021 | Chang | G06F 1/1692 |
| D981,398 | S * | 3/2023 | Chowdhury | D14/316 |
| 11,627,675 | B2 * | 4/2023 | Eisenberg | H05K 5/0217 |
| | | | | 361/807 |
| 11,815,953 | B2 * | 11/2023 | Yao | G06F 1/1649 |
| 11,951,406 | B2 * | 4/2024 | Mizrachi | A63F 13/53 |
| 12,287,668 | B2 * | 4/2025 | Wang | G06F 1/1681 |
| 2002/0012898 | A1 * | 1/2002 | Shechter | F41G 3/2655 |
| | | | | 434/21 |
| 2002/0197584 | A1 | 12/2002 | Kendir et al. | |
| 2004/0198458 | A1 * | 10/2004 | Kawamura | H04M 1/0247 |
| | | | | 455/566 |
| 2006/0082518 | A1 * | 4/2006 | Ram | G06F 1/1675 |
| | | | | 345/1.1 |
| 2010/0092925 | A1 * | 4/2010 | Lvovskiy | F41J 5/10 |
| | | | | 434/22 |
| 2012/0135804 | A1 * | 5/2012 | Bender | A61B 5/165 |
| | | | | 463/36 |
| 2012/0274565 | A1 * | 11/2012 | Moser | G06F 1/1649 |
| | | | | 345/1.3 |
| 2013/0154958 | A1 * | 6/2013 | Clavin | G06F 1/1632 |
| | | | | 345/173 |
| 2016/0200851 | A1 * | 7/2016 | Lee | B29C 55/00 |
| | | | | 264/1.6 |
| 2018/0081082 | A1 * | 3/2018 | Koma | C08L 1/30 |
| 2018/0252491 | A1 * | 9/2018 | Son | F41J 9/14 |
| 2019/0146127 | A1 * | 5/2019 | Ikeda | G03B 21/62 |
| | | | | 359/599 |
| 2022/0192337 | A1 * | 6/2022 | Young | A45C 13/262 |
| 2024/0393831 | A1 * | 11/2024 | Koong | G06F 1/1688 |

OTHER PUBLICATIONS

Extended Search Report in related EP patent application 23803107. 4, dated Jul. 16, 2025.

* cited by examiner

100

PORTABLE GAMING CONSOLE

CROSS REFERENCE TO RELATED APPLICATION

This application is a continuation from U.S. patent application Ser. No. 18/337,059 filed Jun. 19, 2023, which was a bypass application from international patent application PCT/IB2023/054523 filed May 1, 2023, which claims the benefit of priority from U.S. provisional patent application No. 63/339,474 filed May 8, 2022, which is incorporated herein by reference in its entirety.

FIELD

Embodiments disclosed herein relate to simulator systems and, in particular, to a gaming system packaged in a portable console.

BACKGROUND

Target practice and shooting simulation systems that use specially adapted weapons that fire lasers instead of live fire may add a new dimension to the shooter gaming experience. Alternatively and additionally, such systems may be useful for shooting skills development. Variations of such systems may be used for gaming simulations of other areas such as flight or vehicle simulation. However, such gaming systems are generally installed at dedicated entertainment facilities thus requiring players to spend valuable time travelling to these entertainment centers. Some users might prefer to use such an immersive system while hosting other players at home or at some other ad-hoc playing facility.

There is therefore a need for a fully functional gaming system that may be mobile (portable) for deployment at convenient locations.

SUMMARY

This disclosure describes systems and methods for simulation gaming. A shooting simulator gaming console as disclosed herein includes a computing device, multiple display options and one or more trackers for detecting simulated weapon activity. Advantageously, the gaming console may be fully self-contained, enabling provision of gaming sessions at convenient and ad-hoc locations.

As used herein the terms virtual ammunition, virtual firing, virtual hit, and similar terms relate to use of the disclosed system in methods for simulated use of weapons such as for gaming purposes. As used herein the terms "user", "player" and/or "gamer" may refer to a human user of the console described herein. As used herein a "game" may refer to any gaming environment for performing simulated activities including but not limited weapon usage, reconnaissance, piloting vehicles, or a combination of these or other activities.

Consistent with some embodiments, a portable gaming console, includes: an enclosure; a controller housed in the enclosure and including a processor and a non-transitory computer readable medium; a main display housed in a lid of the enclosure and in data communication with the controller; and a sub-display housed in the enclosure and in data communication with the controller, wherein the sub-display is configured to be folded out of the enclosure, wherein the gaming console is configured to run a game using the controller and to display the game on the main display and supplemental game data on the sub-display.

In some embodiments, the portable gaming console further includes a tracking unit, wherein the tracking unit is configured to detect a laser beam reflected off the main display. In some embodiments, the portable gaming console is configured to display the game on an external display, wherein the tracking unit is configured to detect a laser beam reflected off the external display.

In some embodiments, the laser beam is generated by a laser transmitter attached or integrated into a weapon. In some embodiments, when a plurality of weapons each with an integrated or attached laser transmitter each generate a laser beam, the tracking unit is configured to differentiate between the generated laser beam of each laser transmitter reflected off the main display or the external display.

In some embodiments, the portable gaming console further includes interface components for interaction of a user with the gaming console. In some embodiments, the sub-display includes a touch screen and wherein the touch screen is configured for interaction of a user with the gaming console. In some embodiments, the portable gaming console is configured for data communication with other portable gaming consoles.

In some embodiments, the main display is coated on a display surface with a transparent dispersive material. In some embodiments, the enclosure has the form of a ruggedized trolley suitcase.

In some embodiments, a method for multiplayer gaming includes providing the portable gaming console as described above and using the portable gaming console to play a multiplayer game. In some embodiments, the method further includes, defining players, game scenarios and player roles for playing a game on the portable gaming console.

In some embodiments, a method for multiplayer gaming, includes, providing a plurality of the portable gaming consoles described above; using data networking to connect the plurality of portable gaming consoles, thereby obtaining a plurality of networked portable gaming consoles; defining player roles and scenarios for each of the portable gaming consoles, wherein at least two of the portable gaming consoles run different scenarios; and using the plurality of networked portable gaming consoles to play a multiplayer game.

This Summary is provided to introduce a selection of concepts in a simplified form that are further described below in the Detailed Description below. It may be understood that this Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings.

BRIEF DESCRIPTION OF THE DRAWINGS

Aspects, embodiments and features disclosed herein will become apparent from the following detailed description and claims when considered in conjunction with the accompanying drawings. In the drawings:

DETAILED DESCRIPTION

Figure 1A:
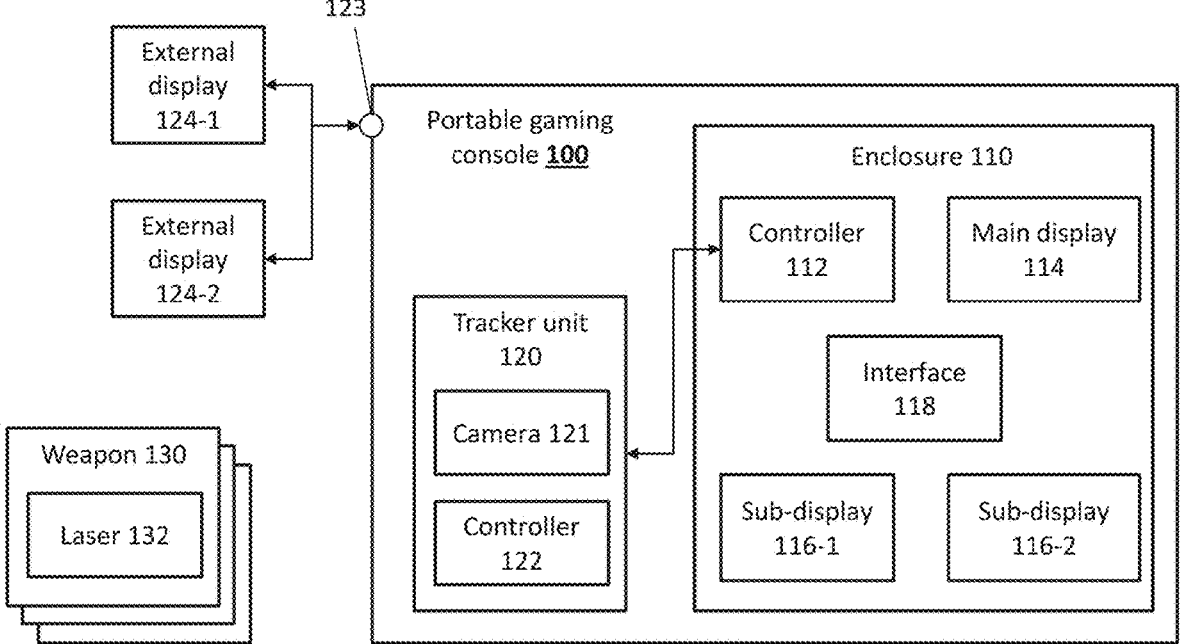
FIG. 1A is a block diagram a portable gaming console according to some implementations.

Reference will now be made in detail to non-limiting examples of gaming systems and methods which are illustrated in the accompanying drawings. The examples are described below by referring to the drawings, wherein like reference numerals refer to like elements. When similar reference numerals are shown, corresponding description(s) are not repeated, and the interested reader is referred to the previously discussed figure(s) for a description of the like element(s).

Aspects of this disclosure may provide a technical solution to the challenging technical problem of portable gaming consoles and may relate to a system for providing portable gaming with the system having at least one processor (e.g., processor, processing circuit or other processing structure described herein), including methods, systems, devices, and computer-readable media. For case of discussion, example methods are described below with the understanding that aspects of the example methods apply equally to systems, devices, and computer-readable media. For example, some aspects of such methods may be implemented by a computing device or software running thereon. The computing device may include at least one processor (e.g., a CPU, GPU, DSP, FPGA, ASIC, or any circuitry for performing logical operations on input data) to perform the example methods. Other aspects of such methods may be implemented over a network (e.g., a wired network, a wireless network, or both).

As another example, some aspects of such methods may be implemented as operations or program codes in a non-transitory computer-readable medium. The operations or program codes may be executed by at least one processor. Non-transitory computer readable media, as described herein, may be implemented as any combination of hardware, firmware, software, or any medium capable of storing data that is readable by any computing device with a processor for performing methods or operations represented by the stored data. In a broadest sense, the example methods are not limited to particular physical or electronic instrumentalities, but rather may be accomplished using many differing instrumentalities.

Embodiments disclosed herein relate to a portable gaming console. FIG. 1A is a block diagram a portable gaming console 100 according to some implementations. FIGS. 1B-1E are illustrative drawings of a portable gaming console 100 according to some implementations. As shown in FIG. 1A, portable gaming console 100 may be contained in an enclosure 110. The components of portable gaming console 100 that may be contained in enclosure 110 include a controller 112, a main display 114, and one or more sub-displays 116. Other components of portable gaming console 100 may be removable from enclosure 110 including interface components 118, and one or more tracker units 120.

Portable gaming console 100 may include computer graphics interfaces 123 to enable use of portable gaming console 100 with one or more external displays 124. Shooting games may make use of a simulated weapon 130 with an integrated or attached laser transmitter 132 configured to emit laser light responsive to the pulling of a trigger of simulated weapon 130.

Enclosure 110 may have the form a trolley suitcase as known in the art including wheels and carrying/pulling handles. In some embodiments, the exterior of enclosure 110 may be formed of an impact resistant material. In some embodiments, enclosure 110 may be ruggedized. In some embodiments, enclosure 110 may have dimension of 2.7 ft. wide by 1.7 ft. tall. In some embodiments, enclosure 110 and the contents therein may have a weight that can be borne by single individual to thus enhance the portability of portable gaming console 100. Enclosure 110 may be openable for use of the components of system 100 therein and closeable for transport or protection of portable gaming console 100.

Figure 1B:
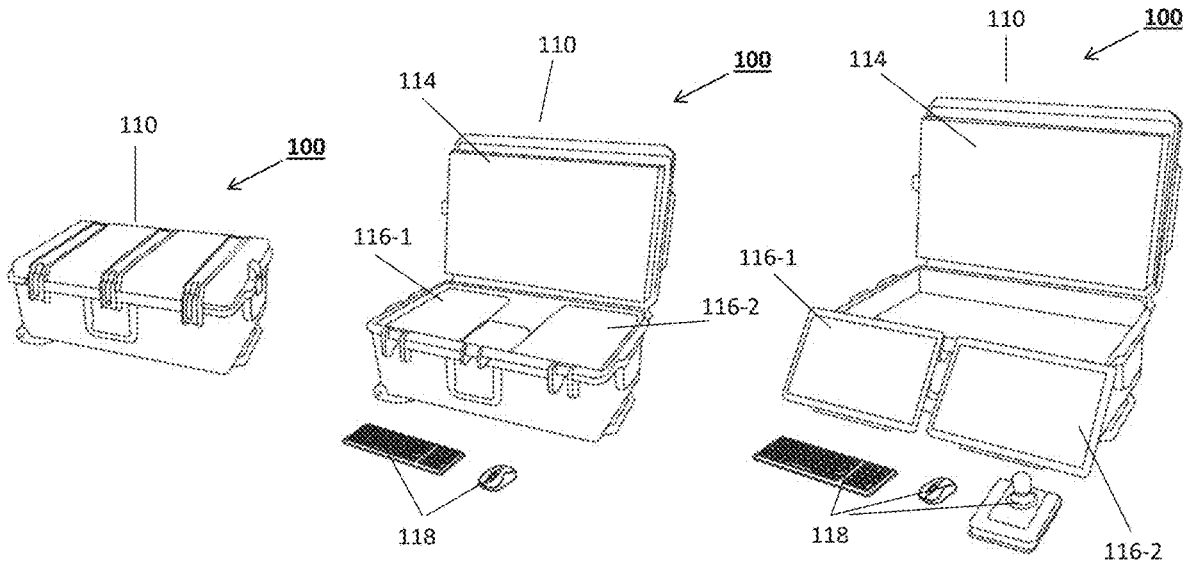
FIGS. 1B-1E are illustrative drawings of portable gaming consoles according to some implementations.
Figure 1C:
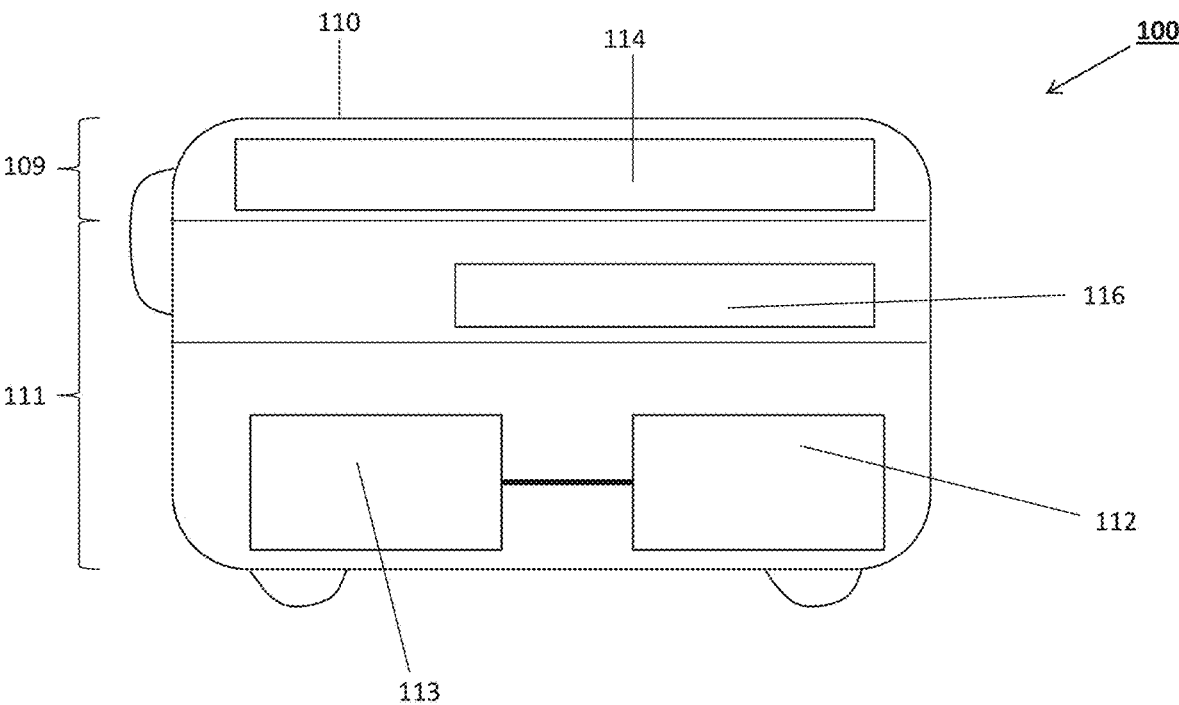
Figure 1D:
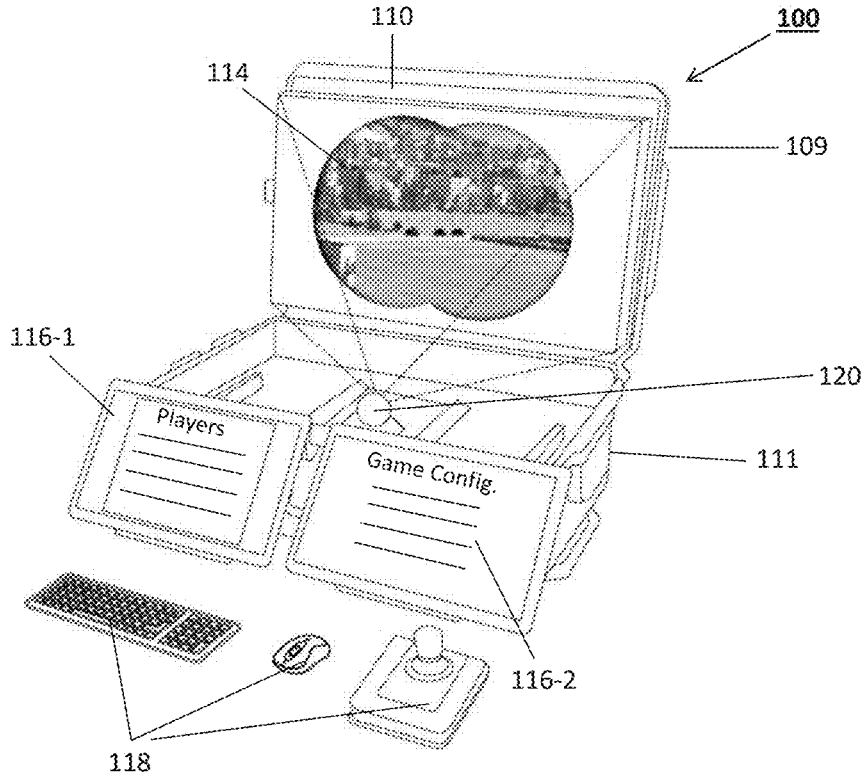

FIG. 1B shows enclosure 110 in closed and open states. FIG. 1C shows enclosure 110 in a closed cross-sectional view with main display 114 in lid section 109 and one of sub-displays 116 as well as controller 112 fixedly mounted in base 111. FIG. 1D shows open enclosure 110 including a lid section 109 and a base section 111.

Controller 112 and the modules and components that are included in controller 112 may include a processor and non-transitory computer readable medium containing instructions that, when executed by the at least one processor, are configured to perform the functions and/or operations necessary to provide the functionality described herein. Controller 112 may manage the operation of the components of portable gaming console 100 and may direct the flow of data between the components of portable gaming console 100. Where portable gaming console 100 may be said herein to provide specific functionality or perform actions, it should be understood that the functionality or actions are performed by controller 112 that may call on other components of portable gaming console 100. In some embodiments, controller 112 includes water cooling 113 (FIG. 1C) for the components of controller 112. Controller 112 is configured to store (such as on the non-transitory computer readable medium) and operate one or more gaming applications such as but not limited to a target practice (shooting) game.

Main display 114 may be fixedly attached to the upper lid 109 of enclosure 110. In some embodiments, main display 114 may be coated on a display surface with a transparent dispersive material (such as but not limited to foil, net, or paint) for increasing the dispersive reflectivity of the display surface to reduce reflections from laser beams aimed at main display 114 during shooting simulations, such as laser transmitter 132 mounted on or integrated into simulated weapon 130. In some embodiments, main display 114 may have a diagonal of 32 inches. In some embodiments, the image of display 114 may be duplicated onto one or more external displays 124.

As shown in FIG. 1A, for example, two external displays 124-1 and 124-2 may be connected to portable gaming console 100. It should be appreciated that only one, or more than two external displays may be connected to portable gaming console 100.

Figure 1E:
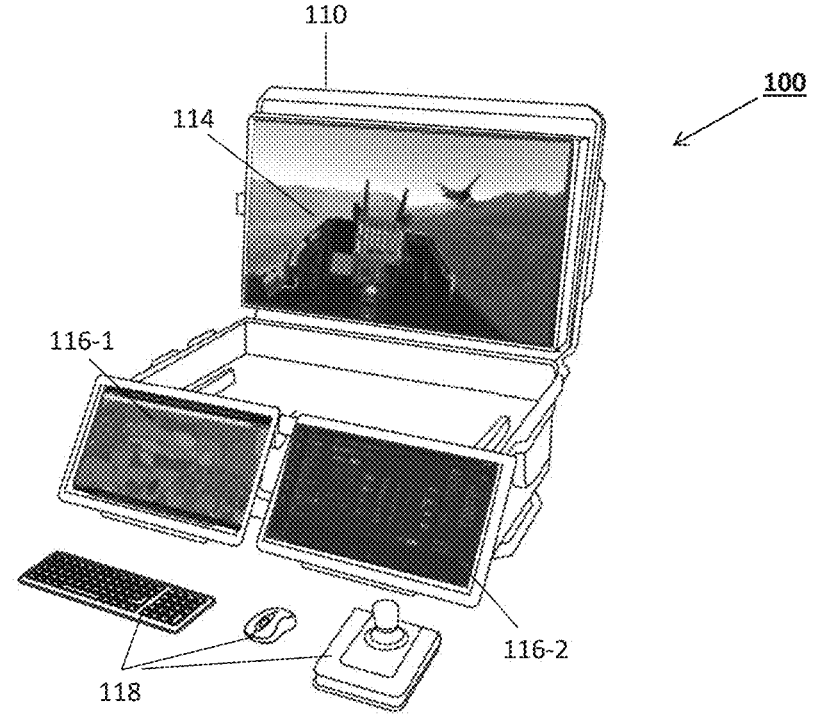

In some embodiments, two sub-displays 116, shown in FIGS. 1A-1E as sub-displays 116-1 and 116-2, may be provided. In some embodiments, sub-displays 116 may display supplementary simulator information and/or configuration/settings related to a simulation application displayed on main display 114. In some embodiments, a game/simulation or part of a game/simulation may be shown on one or both of sub-displays 116. In some embodiments, sub-displays 116 may include touch screens for interacting by a user with a simulation application. In some embodiments, such as shown in FIGS. 1B, 1D and 1E, sub-displays 116 may fold out of enclosure 110. The folded-out position of sub-displays 116 is exemplary and other positions may be contemplated. In some embodiments, sub-displays 116 may have a diagonal of 15.6 inches.

FIGS. 1B, 1D and 1E show exemplary usage of sub-displays 116. For example (FIG. 1D), while main display 114 may show a simulated target for users to shoot at, a first sub-display 116-1 may show supplementary information (user scoring), and a second sub-display 116-2 may display other supplementary information (configuration settings) for the target practice shown on main display 114. In a further example (FIG. 1E), while main display 114 may show a pilot view of a flight simulator, a first sub-display 116-1 may show a map, and a second sub-display 116-2 may display simulated aircraft operational indicators.

Interface components 118 may be provided as part of console 100 for interaction by a user with portable gaming console 100 such as for controlling simulation applications running on portable gaming console 100. Interface components 118 may be provided with a wired or wireless connection to controller 112. Interface components 118 may include devices known in the art for computing interaction such as but not limited to mouse, keyboard, touchscreens, microphone (for voice interaction/control), and speakers/headset (for audio output). In some embodiments, interface components 118 may include a simulation specific interface component such as a joystick. Interface components 118 may include data network interfaces (such as but not limited to LAN and/or WiFi interfaces) for connection of portable gaming console 100 to data networks and/or to other portable gaming consoles 100.

Tracking unit 120 (FIG. 1D) may include a camera 121 and tracker controller 122. Tracker controller 122 may be a computing device as defined herein. Tracker controller 122 may include a processor and non-transitory computer readable medium containing instructions that when executed by the at least one processor are configured to perform the functions and/or operations necessary to provide the functionality described herein related to tracking unit 120. In some embodiments, the at least one processor of tracker controller 122 may run a video analysis processing application (not shown) configured to analyze video data provided by camera 121 and to feed analyzed video data to controller 112.

In some embodiments camera 121 may be a high-speed industrial camera. In some embodiments, camera 121 may have a resolution of 1440×1080 and support a frame rate of up to 238 FPS. In some embodiments, tracking unit 120 may be in wireless communication with controller 112. In some embodiments, tracking unit 120 may be configured to be mounted on lid 109 when lid 109 is in an open state. In some embodiments, tracking unit 120 may be configured to be mounted inside enclosure 110 when lid 109 is in an open state.

In some embodiments, a laser transmitter 132 may be coupled to or mounted onto a weapon 130 in order to use simulated weapon 130 in a simulation. The laser transmitter 132 may emit laser light responsive to the pulling of the trigger of weapon 130. The propagation of the emitted laser light may be descriptive of the trajectory of live ammunition that would be fired by the weapon 130 responsive to the pulling of the trigger.

In some embodiments, tracking unit 120 may detect reflected laser light that is generated by laser transmitter 132 and reflects off main display 114 or external display 124. In use, camera 121 may be positioned so as to substantially capture a view of all of main display 114 (FIG. 1D) or all of external display 124 to thereby perform analysis by tracker processor 122 on the images that are provided by camera 121. Tracker controller 122 may then determine based on a laser position on a displayed target whether or not a laser transmitted by laser transmitter 132 as part of virtual firing has scored a virtual hit on a target and also what part of a target has been hit.

In some embodiments, multiple players using multiple weapons 130 may be simultaneously used in a multiplayer game/simulation operated by portable gaming console 100. In some embodiments, each portable gaming console 100 may support up to 10 weapons.

In some embodiments, in multiplayer games, each laser transmitter 132 may transmit a code or other form of unique identifier in the fired laser that can be determined by tracker unit 120 to belong to the laser transmitter 132 of a specific player to thereby track the shooting performance of a player, particularly in multiplayer games where each player may have their own weapon with an embedded/attached laser transmitter 132. In such a multiplayer game tracker unit 120 may thus associate the laser emitted from each separate laser transmitter 132 with a specific player, to thereby track the player's shooting once the game commences and multiple laser transmitters 132 each corresponding to a player emit lasers simultaneously or near simultaneously that may be reflected off main display 114 or external display 124.

In some embodiments, in order to increase the number of supported players, multiple portable gaming consoles 100 may be networked together such as by using network interfaces of portable gaming consoles 100. In some embodiments, when networked together, each of portable gaming consoles 100 may adopt a different role in a game/simulation. In a non-limiting example, some players on a first console may be allocated shooting roles, while other players on a second console are allocated driving or flying roles, where all players are playing within the same game environment in cooperative or competition modes.

Figure 2A:
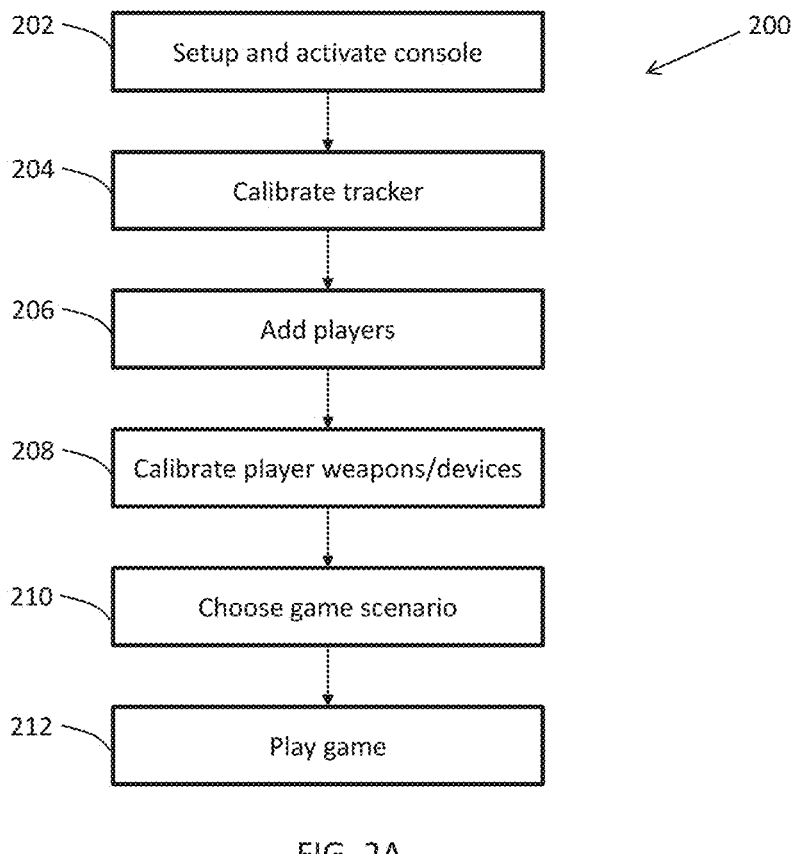
FIG. 2A is a flowchart showing a process for operation of a portable gaming console according to some implementations.
Figure 2B:
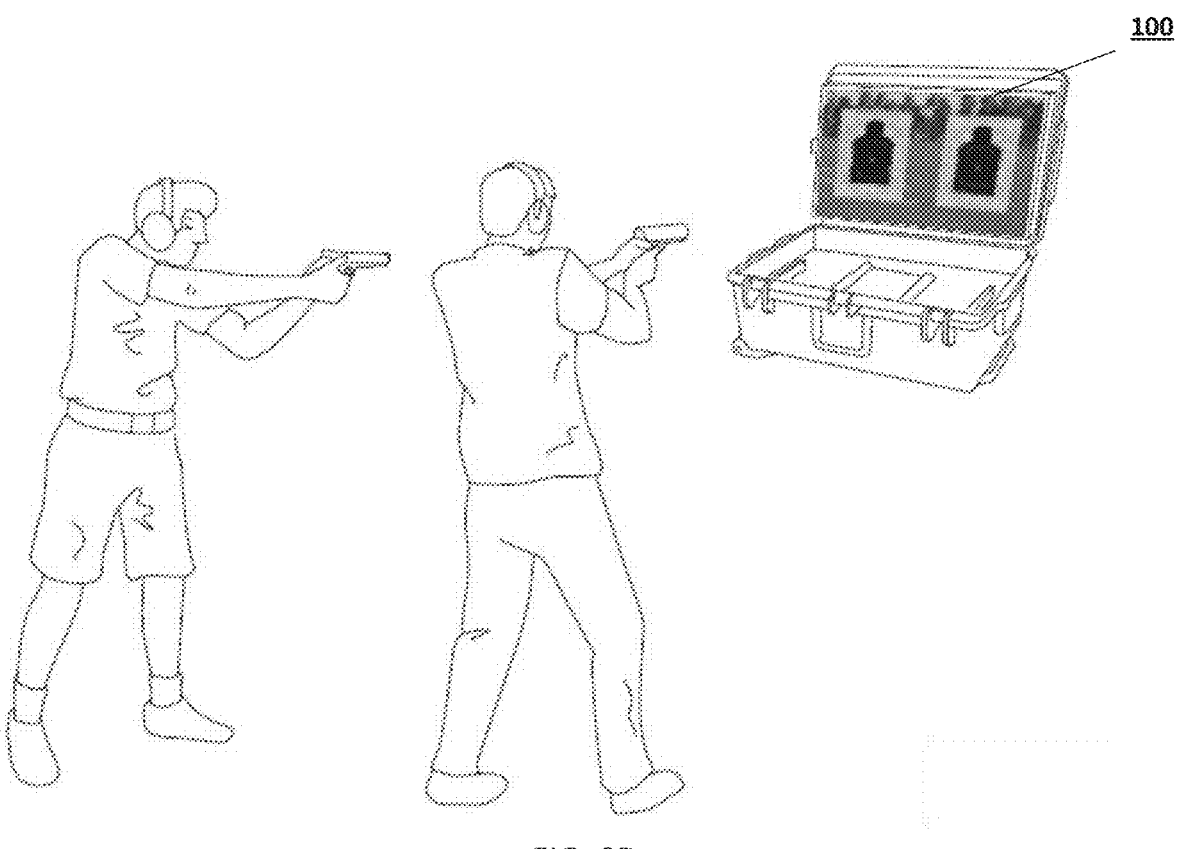
FIGS. 2B-2D show exemplary simulation configurations using a portable gaming console according to some implementations.
Figure 2C:
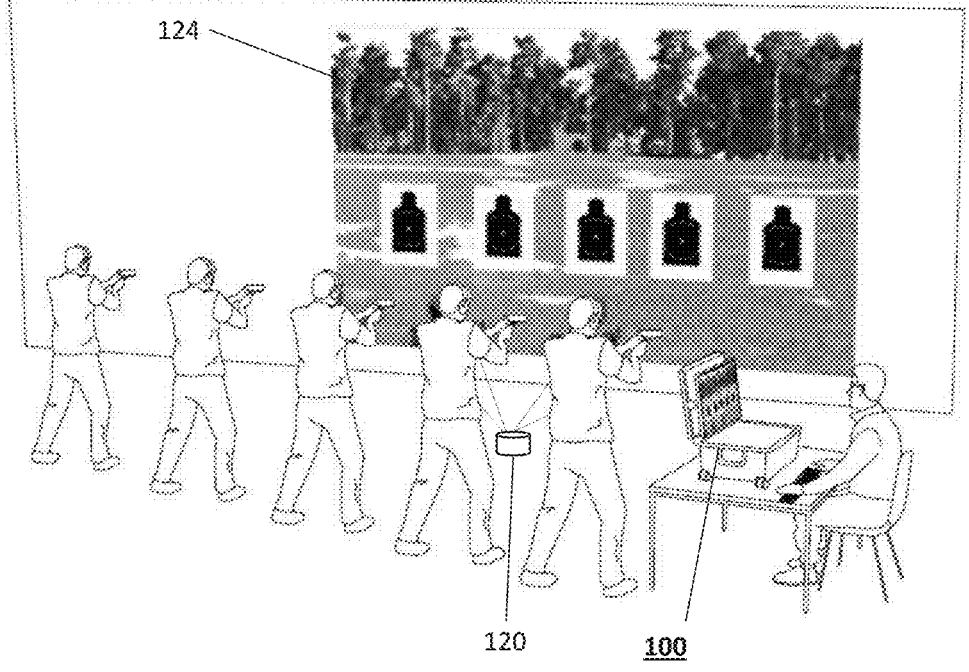
Figure 2D:
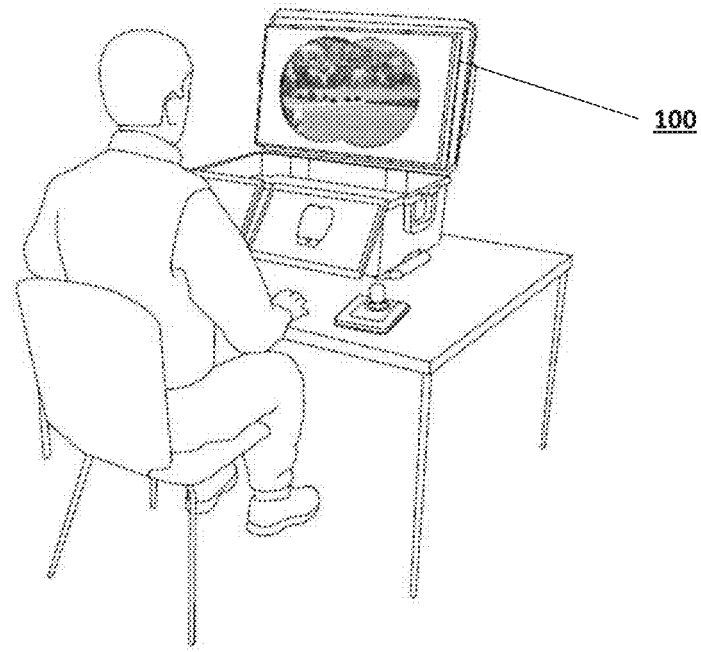

FIG. 2A is a flowchart showing a process 200 for operation of a portable gaming console according to some implementations. FIGS. 2B-2D show exemplary simulation configurations using a portable gaming console 100 according to some implementations. A non-transitory computer readable medium may contain instructions that when executed by at least one processor performs the operations described at each step as part of process 200. Process 200 may be performed using portable gaming console 100 and the non-transitory computer readable medium and at least one processor may correspond to controllers 112 and tracker controller 122.

In step 202, console 100 may be set up for usage including positioning on a surface for convenient operation by a user such as on a table, connecting to a power source, opening enclosure 110, powering on console 100, folding out sub-displays 116, connecting console 100 to one or more external displays 124 and placing interface components 118 in convenient usage positions. In some embodiments, a desired simulation application may be activated (such as by a user using interface components 118).

In step 204, tracker 120 may be calibrated by being positioned facing main display 114 or positioned facing external display 124 (such that camera 121 is sufficiently far from main display 114 or external display 124 to capture all of a displayed image). In some embodiments, calibration is initiated automatically once tracker 120 is positioned facing main display 114 or positioned facing external display 124. In some embodiments, calibration may be initiated following positioning of tracker 120 by interaction of a player portable gaming console such as through interfaces 118. Calibration as used herein refers to the identification by tracker 120 of image points of interest needed for the game such as the image boundaries and target positions on the image displayed on main display 114 or external display 124.

In step 206, one or more users may be defined in the simulation application such as by interaction of a user with sub-displays 116. Where multiple portable gaming consoles 100 are networked together, a single of the portable gaming consoles 100 (acting as a "master" console) may be used to define the players associated with each portable gaming console 100.

In step 208, where training (simulated) weapons 130 are used, these may be calibrated opposite main display 114 or external display 124. In some embodiments, a shooter may stand in front of display 114 or external display 124 and shoot several calibration shots (using laser transmitter 132 to thereby perform zeroing of a weapon 130. Where interface components include a simulation specific interface component such as a joystick, this interface component may be calibrated as part of step 208.

In some embodiments, in multiplayer games, each laser transmitter 132 may transmit a code in the fired laser that can be determined by tracker unit 120 to belong to the laser transmitter 132 of a specific player to thereby track the shooting performance of a player. As part of step 208, each player having their own weapon with an embedded/attached laser transmitter 132 may in turn shoot several calibration shots, thus enabling tracker unit 120 to associate the laser emitted from each separate laser transmitter 132 with a specific player, to thereby track the player's shooting once the game commences and multiple laser transmitters 132 each corresponding to a player emit lasers simultaneously or near simultaneously that may be reflected off main display 114 or external display 124.

In step 210, a user may choose the game scenario and/or environment and/or other game parameters such as by interaction of a user with sub-displays 116. In a non-limiting example, a target practice scenario may be chosen such as shown in FIG. 2B or 2C. In a non-limiting example, a reconnaissance style game scenario may be chosen such as shown in FIG. 2D.

In some embodiments, when networked together, the role of each of portable gaming consoles 100 may be defined including the roles of each player associated with each portable gaming console in a game/simulation. In a non-limiting example, some players on a first console may be allocated shooting roles, while other players on a second console may be allocated reconnaissance, driving or flying roles, where all players are playing within the same game environment in cooperative or competition modes.

In step 212, the game may be started. Exemplary simulation configurations are contemplated using console 100 and optionally external display 124. In some embodiments, such as shown in FIG. 2B target practice may be provided for user's firing towards main display 114.

In some embodiments, such as shown in FIG. 2C target practice may be provided for players firing towards external display 124 while console 100 is operated by a user viewing main display 114.

In some embodiments, such as shown in FIG. 2D a reconnaissance vehicle game scenario may be provided for a player viewing main display 114 and viewing and interacting with sub-displays 116 that provide supplemental data related to the game such as vehicle instruments.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made.

What is claimed is:

1. A portable gaming console, comprising:
a ruggedized portable enclosure;
a controller housed in the enclosure and including a processor and a non-transitory computer readable medium;
a main display housed in the enclosure and in data communication with the controller;
a sub-display housed in a base of the enclosure and in data communication with the controller, wherein the sub-display is configured to fold out from the enclosure into a deployed position below and forward of the main display and outside of the base while remaining attached to the enclosure; and
a tracking unit configured to detect a laser beam directed at the main display by analysis of video captured by a camera in the tracking unit, wherein the camera is facing the main display.

2. The portable gaming console of claim 1, wherein the gaming console is configured to run a shooting game using the controller and to display the shooting game on the main display and supplemental shooting game data on the sub-display.

3. The portable gaming console of claim 1, wherein the laser beam is generated by a laser transmitter attached to or integrated in a weapon.

4. The portable gaming console of claim 1, wherein the laser beam includes a plurality of laser beams, each laser beam generated by a respective laser transmitter in each of a plurality of weapons, and wherein the tracking unit is configured to identify the laser beam of each laser transmitter directed at the main display based on a code transmitted in the laser beam.

5. The portable gaming console of claim 1, wherein the sub-display includes a touch screen and wherein the touch screen is configured for interaction of a user with the gaming console.

6. The portable gaming console of claim 1, configured for data communication with other portable gaming consoles to increase a number of players participating in the shooting game and/or to enable each portable gaming console to adopt a different role in the shooting game.

7. The portable gaming console of claim 1, wherein the enclosure has the form of a ruggedized trolley suitcase.

8. The system of claim 1, wherein the first display is coated on a display surface with a transparent dispersive material configured to disperse reflections from the laser beam aimed at the first display for detection of the dispersed laser beam by the tracking unit.

9. A method for operating a shooting game, comprising:
   providing a portable gaming console including a ruggedized portable enclosure, a controller housed in the enclosure and including a processor and a non-transitory computer readable medium, a main display and a sub-display housed in a base of the enclosure and in data communication with the controller, wherein the sub-display is configured to fold out from the enclosure into a deployed position below and forward of the main display and outside of the base while remaining attached to the enclosure, and a tracking unit; and
   by the controller, running the shooting game, directing a laser beam generated by a laser transmitter at the main display as part of the shooting game, and analyzing a video stream captured by a camera in the tracking unit facing the main display to detect the laser beam directed at the main display.

10. The method of claim 9, further comprising displaying the shooting game on the main display and displaying supplemental game data on the sub-display.

11. The method of claim 9, wherein the laser transmitter is attached to or integrated in a weapon.

12. The method of claim 9, further comprising:
   by a plurality of laser transmitters, directing a respective laser beam of each laser transmitter at the main display as part of the shooting game; and
   by the tracking unit, identifying each laser beam directed at the main display based on a code transmitted in each respective laser beam.

13. The method of claim 9, further comprising:
   networking together multiple portable gaming consoles to increase a number of players participating in the shooting game and/or to enable each portable gaming console to adopt a different role in the shooting game.

14. A system comprising,
   a portable enclosure; and
   a first display housed in the enclosure;
   wherein the first display is coated on a display surface with a transparent dispersive material configured to disperse reflections from a laser beam aimed at the first display for detection of the dispersed laser beam by a tracking unit.

15. A portable gaming console, comprising:
   a ruggedized portable enclosure;
   a controller housed in the enclosure and including a processor and a non-transitory computer readable medium;
   a main display housed in the enclosure and in data communication with the controller; and
   a sub-display housed in a base of the enclosure and in data communication with the controller, wherein the sub-display is configured to fold out from the enclosure into a deployed position below and forward of the main display and outside of the base while remaining attached to the enclosure.

16. A method for operating a shooting game, comprising:
   providing a portable gaming console including a ruggedized portable enclosure, a controller housed in the enclosure and including a processor and a non-transitory computer readable medium, a main display and a sub-display housed in a base of the enclosure and in data communication with the controller, wherein the sub-display is configured to fold out from the enclosure into a deployed position below and forward of the main display and outside of the base while remaining attached to the enclosure, and a tracking unit; and
   by the controller, running the shooting game.

* * * * *